Figure 1:
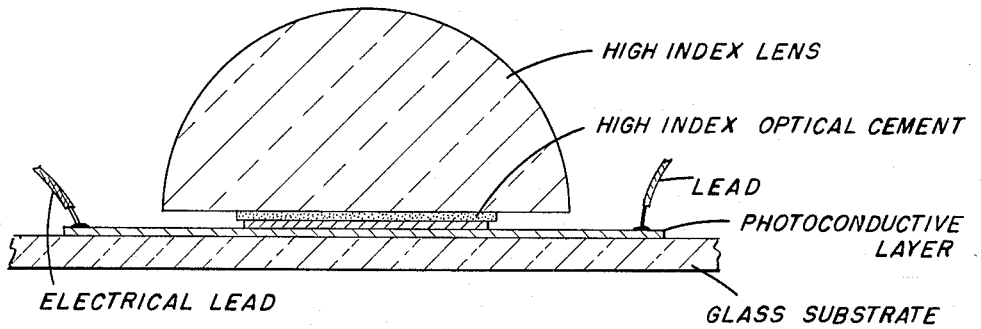

DONALD R. MOREY
STUART SHELDON
INVENTORS

3,239,675
OPTICALLY IMMERSED PHOTOCONDUCTIVE CELLS

Donald R. Morey and Stuart Sheldon, Rochester, N.Y., assignors to Eastman Kodak Company, Rochester, N.Y., a corporation of New Jersey
Filed Dec. 17, 1962, Ser. No. 246,868
7 Claims. (Cl. 250—211)

This invention relates to integral units of infrared detectors and lenses and to their method of preparation. In a specific aspect this invention relates to infrared detectors joined to lenses by a novel bonding cement and to their method of preparation.

In the field of optics it is known that "optical gain" is obtained by the use of a lens of high refractive index, acting as a collector of radiation which is finally absorbed by a detector element. Inherent in this type of optical gain is the need for continuous optical contact between lens and detector, avoiding any air interface or other interface of low refractive index. Pure germanium, silicon, zinc sulfide, zinc selenide and the like make good lens material for the infrared region beyond two microns, while a lens of strontium titanate or of titanium dioxide (rutile) is useful when wavelengths through the visible are also desired. Examples of infrared detectors which can be used are bolometers and lead selenide and lead sulfide thin film photoconductors.

The theory and practice of "optical gain" or "immersed" detectors has been described in U.S. Patent 2,964,636. It is evident that for high optical efficiency, the indices of lens, detector and cement joining the lens and detector should all be high and quite similar to avoid reflection losses. Ideally, if the detector element could be optically contacted directly to the lens, then there would be maximum gain. In the case of germanium, this is not possible because the germanium, being conducting, shorts out the detector. Therefore, an insulating material must separate the two. In addition, even with an insulating lens such as strontium titanate, a binding material is necessary to exclude all traces of air interface, to provide mechanical strength, and to fill in surface irregularities of the detector, which would otherwise trap microscopic voids of air and act as scattering centers.

The choice of "cementing" material is thus of importance. It is known that selenium, and arsenic-modified selenium glass, has been used as an interface cement and for a number of applications satisfactory results are obtained. However, in cases where the integral unit may be subjected to temperatures over 100° C., as may happen in field use and in sealed units where power dissipation takes place, then a higher melting "cement" must be found, but prior to our invention such cements were not available.

It is an object of this invention to provide novel optically immersed photoconductive cells.

It is another object of this invention to provide novel photosensitive units of lenses and photoconductive elements bonded by novel cements effective at temperatures of at least 100° C.

It is another object of this invention to provide a novel process for bonding lenses to photoconductive elements.

Further and additional objects of our invention will be apparent form the following detailed disclosure.

In accordance with our invention we have found that novel photosensitive units can be prepared by coating one or both surfaces of a lens and of a photoconductive element with an optical cement, having a melting point above 200° C., infrared transmission to at least 10 microns, high electrical resistivity and a refractive index of at least 2 at one micron wavelength.

The lenses that are employed to produce the photosensitive units of this invention can be made from germanium, silicon, zinc sulfide, zinc selenide or other similar materials that have been found to be suitable for lens formation. The front surface of the lens is convex and the rear surface to which the photoconductive elements are attached or cemented is flat. The photoconductive elements that are employed in the formation of these photosensitive units can be prepared from lead sulfide, lead selenide, or other materials that are known to be suitable for photoconductive purposes. The photoconductive layer of lead sulfide, lead selenide or similar material is deposited on a substrate such as glass by evaporation or chemical deposition procedures and this photoconductive cell is then attached in accordance with our invention to the back, flat surface of the lens.

The optical cement or bonding material that we have found useful in the practice of our invention has specifically defined properties such as a melting point above 200° C., infrared transmission to at least 10 microns, a refractive index of at least 2 at one microns wavelength and a high electrical resistivity. Among the materials that we have found useful as an optical cement in preparing these photosensitive units are aresenic trisulfide, arensic triselenide, antimony trisulfide, antimony triselenide, thallium bromide-chloride, thallium bromide-iodide and the like. These materials are excellent optical cements in preparing the photosensitive units of our invention and the use of these optical cements makes it possible for us to produce photosensitive units that possess properties not present in the prior art types of photosensitive units.

In order to use these optical cements in the preparation of photosensitive units we have found it desirable to use special procedures. A melt or dip process in the open air is too crude and uncontrolled to lead to useful results due to the delicate nature of the detectors or photoconductive elements, their small size, and to the need for controlled film thickness. Also, the presence of microscopic air pockets next to the surface of the photoconductive element is difficult to eliminate in a process performed in the open air, and it is one of the advantages of our invention that these microscopic air pockets can be substantially reduced and virtually eliminated.

In preparing our photosensitive units we join or bond the flat rear surface of the lens to the photoconductive element with one of our optical cements under a high vacuum. A layer of the optical cement is deposited on one or preferably both of the surfaces to be bonded by an evaporation procedure under vacuum where the pressure is not substantially above $10^{-5}$ mm. of mercury. The thickness of the layer of optical cement does not exceed about 5 microns and the two surfaces to be bonded or joined are then brought together in carefully controlled alignment while still under a high vacuum and under a slight contacting pressure. The units are then heated under vacuum to a temperature of at least 200° C. and preferably above 250° C. to produce a bond which is mechanically strong and optically efficient. By operating under a high vacuum and thus keeping the surfaces to be bonded substantially degassed there is no absorbed layer of air or water vapor on either of the surfaces to be bonded and the presence of the microscopic pockets of air or water vapor is eliminated.

Figure 2:
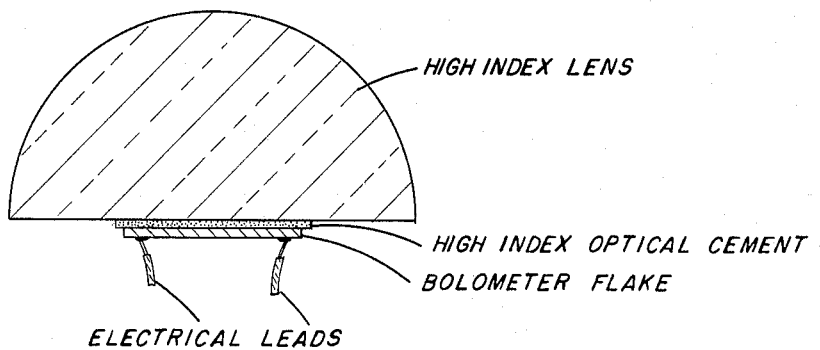

FIG. 1 illustrates a photosensitive unit prepared in accordance with our invention showing the essential parts of an integral unit containing a high index lens and a photoconductive element joined by a high index optical cement. FIG. 2 illustrates another aspect of our invention showing an integral unit of a thermal detector such as a bolometer and a lens bonded together by a high index optical cement.

It is apparent that the success of the invention will depend on details of the mechanical devices. The detectors are often small and delicate, particularly in the case of bolometer flakes which may be as small as 0.010 x 0.020 inch and the order of 0.001 inch thick. They must be handled without bending or cracking which would lead to electrical noise in their use. Bolometer flakes may be held by laying them on the smooth surface of strong magnets, by making use of the electrical leads, or by adhesive methods. Of course, when the flake, or detector, is large, it may be held by mechanical clips.

When the lens and detector are to be contacted and heated together while in a high vacuum, then it is advantageous to coat each of these surfaces with the optical cement material just prior to the contacting operation. This evaporation is not readily carried out from a boat which holds the material as a powder, since it is inconvenient to hold both surfaces above the powder and yet parallel to each other. It is more convenient to evaporate from a secondary source, such as a quartz lamp, the surface of which has carried a film already deposited in a prior step. Evaporations can then be carried out in any direction, and by use of several secondary sources, can be made to produce thick deposits if needed.

Since the whole purpose of the finished product is to provide optical gain, accurate alignment of the detector at the focus of the lens is necessary. Particularly in the case of small elements, alignment becomes most important, with accuracies to .001 inch. This is accomplished by accurate placement of lens and detector in separate holders which are in a separate position during evaporation, and are then brought together, while still under good vacuum. This alignment can be made by the use of taper pins in one holder and taper holes in the other. Mechanical movements may be made from outside the bell jar by bellows or by ring sealed shafts.

The final step is then one of applying heat to the interface so that the molecular adhesion of the surfaces is facilitated. This heat may be supplied from a heat source which uses the lens itself to focus this energy on the detector and optical cement, or it may be supplied from radiative or conductive heaters which heat the whole assembly more slowly. Following cooling, the unit is ready for use.

Although the invention has been described in considerable detail with reference to certain preferred embodiments thereof, variations and modifications can be effected within the spirit and scope of the invention as described hereinabove and as defined in the appended claims.

We claim:

1. A photosensitive unit comprising a lens, the front surface of which is convex, a photoconductive element and a thin film of cement attaching said photoconductive element to the rear surface of said lens, said cement comprising an antimony or arsenic compound having a melting point above 200° C., infrared transmission to at least 10 microns, high electrical resistivity and a refractive index of at least 2 at one micron wavelength.

2. A photosensitive unit according to claim 1 wherein the lens material is germanium.

3. A photosensitive unit according to claim 1 wherein the photoconductive element contains lead selenide coated on a substrate.

4. A photosensitive unit in accordance with claim 1 wherein said cement is arsenic trisulfide.

5. A photosensitive unit in accordance with claim 1 wherein said cement is antimony trisulfide.

6. A photosensitive unit in accordance with claim 1 wherein said cement is arsenic triselenide.

7. A photosensitive unit in accordance with claim 1 wherein said cement is antimony triselenide.

References Cited by the Examiner

UNITED STATES PATENTS

| | | | |
|---|---|---|---|
| 2,169,404 | 8/1939 | Buttner | 65—37 |
| 2,221,367 | 11/1940 | Bishop et al. | 156—99 |
| 2,918,757 | 12/1959 | Francl et al. | 106—48 |
| 2,964,636 | 12/1960 | Cary | 250—211 |
| 2,983,823 | 5/1961 | Oberly | 250—211 |
| 3,075,869 | 1/1963 | Yamaguti | 156—99 |
| 3,121,023 | 2/1964 | Spencer et al. | 250—211 X |

RALPH G. NILSON, *Primary Examiner.*

WALTER STOLWEIN, *Examiner.*